Feb. 17, 1925.
W. L. SMITH ET AL
1,526,386
PRESERVATORY CONTAINER
Filed Oct. 9, 1922
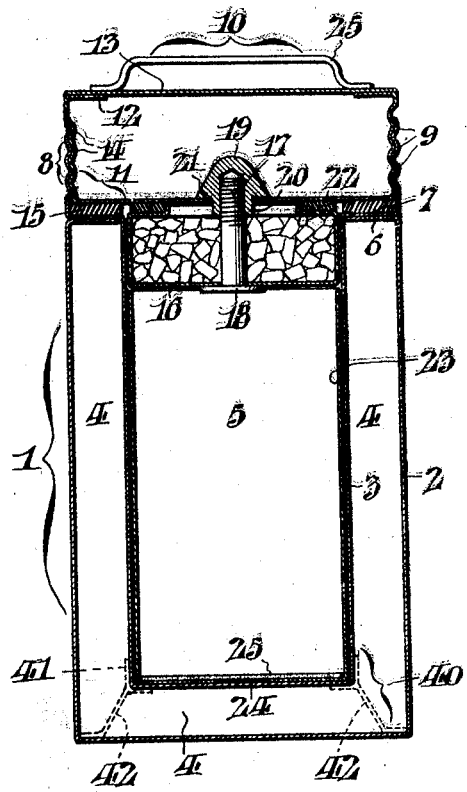
FIG. I.
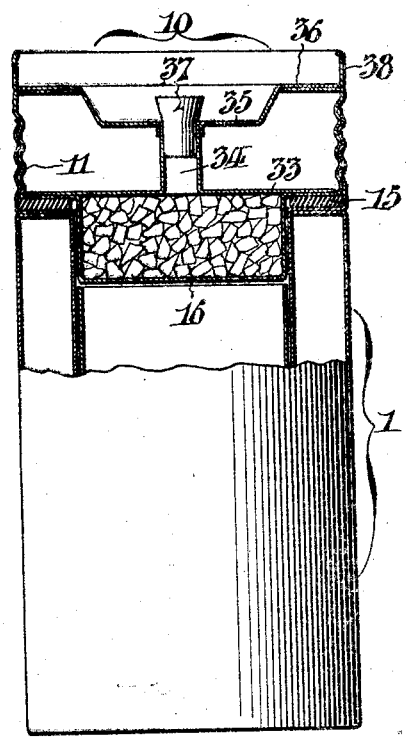
FIG. III.
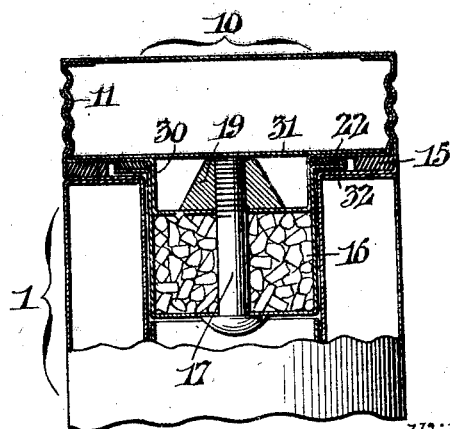
FIG. II.
WITNESSES:
John C. Bergner
Alfred E. Dichinger
INVENTORS:
Wilson Lawrence Smith &
George Tayloe Gwathmey,
BY Fraley & Paul
ATTORNEYS.

Patented Feb. 17, 1925.

1,526,386

UNITED STATES PATENT OFFICE.

WILSON LAWRENCE SMITH, OF CHARLOTTESVILLE, AND GEORGE TAYLOE GWATHMEY, JR., OF ALGONQUIN PARK, VIRGINIA.

PRESERVATORY CONTAINER.

Application filed October 9, 1922. Serial No. 593,192.

*To all whom it may concern:*

Be it known that we, WILSON LAWRENCE SMITH and GEORGE TAYLOE GWATHMEY, Jr., citizens of the United States, residing, respectively, at Charlottesville, in the county of Albemarle and State of Virginia, and Algonquin Park, in the county of Norfolk and State of Virginia, have invented certain new and useful Improvements in Preservatory Containers, whereof the following is a specification, reference being had to the accompanying drawings.

Our invention relates generally to containers for preserving food stuffs and the like and more specifically to that type especially adapted for preserving food stuffs or beverages in a hot or cold condition (as the case may be) for several hours at a time. Containers of this class, as ordinarily constructed, are protected against influence of atmospheric temperatures by virtue of being covered either by an appropriate thickness of thermo-insulating material, for example asbestos wool or saw dust, or by an enveloping jacket from which the air has been withdrawn or evacuated.

The main object of our invention is to enhance the efficiency of containers of the character outlined so that liquids congealed by chilling or freezing (of which ice cream may be suggested by way of example) may be effectively maintained in the desired solidified condition for longer periods than possible by use of preservatory containers heretofore available. This desideratum we secure, in accordance with our invention, by providing for the maintenance of a suitable quantity of an appropriate preservative agent in effective proximity to the contents of the container.

Other objects of our invention are to provide a preservatory container, which admits of utmost simplicity of construction and economy of manufacture, and whose constituent parts may be readily disassembled for cleaning and for charging both with respect to the substance or material to be preserved and the preserving agent.

How these and other objects, together with attendant advantages, may be secured will become readily apparent from the following detailed description of several forms in which our invention is capable of being embodied while its scope is clearly manifested in the appended claims.

In the drawings, Fig. I is an axial sectional view of a preservatory container conveniently showing our invention in one form.

Fig. II is an illustration partly in elevation and partly in axial section of a slightly modified form of the container; and Fig. III is still another alternative form of our invention.

Referring first to the form of Fig. I, it will be observed that the structure there shown comprises a receptacle member comprehensively indicated at 1, and a cover member similarly designated at 10. The receptacle member 1 is preferably made cylindrical in configuration and consists of an outer casing or shell 2 and an inner casing or shell 3 which is axially disposed within the former, the relative diameters and depths of the two being such as to afford an enveloping jacket 4 about the sides and bottom of a central chamber 5 for storage of the substances or material to be preserved. At its upper end, the outer shell 2 has formed therewith an inwardly turned horizontal flange 6 for abutment against a corresponding outwardy turned flange 7 of the inner shell 3, the abutting surfaces being soldered or welded in any approved manner to effect hermetical sealing of the jacket 4. After the two constitutent parts of the receptacle member have been assembled and united in the manner just explained, the jacket 4 is exhausted or evacuated for thermo-insulation so as to be capable of protecting the contents of the storage chamber 5 against the influence of outside or atmospheric temperatures. Such evacuation or exhausting may be effected in accordance with any well-known method. Beyond the flange 7 the inner element or shell 3 of the receptacle member 10 is extended as shown at 8 in even diameter with that of the outer shell 2, the extension having formed thereon a rolled or pressed thread 9 into which the cover member 10 can be screwed.

Coming now to the cover member, the same, it will be observed, is formed as a hollow structure of cylindrical configuration in correspondence with the receptacle member 1. Like the latter, it is made in two parts of which the one marked 11 constitutes the main element, the same being formed at its top with a horizontal inwardly turned annular flange 12 and closed by the companion element 13 which is in the form of a circular disk with a margin adjacent its periphery overlapping and soldered or welded to the flange aforesaid. The side walls of the cover member 10 have formed upon them rolled threads 14 for cooperation with the threads 9 of the receptacle member 1. The space within the cover member is evacuated for a reason analogous to that described in connection with the jacket 4 of the receptacle member.

As a means for effecting a seal between the receptacle member and the cover member, we have shown at 15, an annular gasket of a suitable resilient material, said gasket being interposed between the lower face of the cover member 10 and the margin about the mouth of the receptacle member 1 formed by the laterally turned shoulder flange 7.

In order to provide for the maintenance of a suitable quantity of a preservative agent in effective proximity to the contents of the receptacle 1, we have supplemented the receptacle structure with a holder 16 which is preferably incorporated as a part of the cover member 10 but in the instance shown is made so as to be removable for ready charging and cleaning. This holder 16 is in the form of a cup, cylindrical in form and of such diameter as to be accommodated with slight clearance within the mouth of the storage chamber 5 when the cover member 10 is screwed on to the receptacle 1. The holder 16 is held in place by means of a screw 17 headed at 18 and adapted to engage a nut 19. Said nut 19 has a reduced portion 20 which projects through a central opening in the horizontal portion of the member 14 of the cover. The shoulder 21 of the nut is soldered against the horizontal portion of the cover element 14 so as to be held against rotation and to secure an air tight seal at this juncture. The head 18 of the screw 17 is similarly secured to the bottom portion of the holder 16 so as to be permanently attached thereto. Sealing of the holder 16 after the same has been charged is effected through the medium of an annular gasket 22 whose diameter is somewhat less than the internal diameter of the gasket 15 aforementioned, and which is compressed between the lower face of the cover member 10 and an annular marginal shoulder formed about the top of said holder. By reason of the construction just described, the holder 16 becomes virtually an axial prolongation or projection of the cover member 10 which in the assembly of the structure, occupies a portion of the storage chamber 5 and by virtue of its position, the preservative agent is disposed in effective proximity to the contents of said chamber. Thus for example in the case of preserving ice cream or other congealed fluid, the holder 16 may be charged either with chilled brine or with a mixture of cracked ice and rock salt. In this way the cream may be maintained in a solidified condition for a considerable period of time in excess of that possible in the absence of the preservative agent. In order to obviate difficulties in the removal of such congealed substances, we prefer to provide a separate removable inner vessel 23, either of sheet metal or glass, said vessel being of a diameter conveniently accommodated within the interior of the storage chamber 5. The bottom of the vessel has a central opening 24 which is ordinarily covered by a replaceable false bottom 25. When the vessel 23 is withdrawn from the receptacle for removal of the contents, the latter act may be accomplished simply and quickly by pressure upon the false bottom 25 by use of any suitable instrument capable of being introduced through the central opening 24. If desired, the cover member 10 may be provided with a handle 25 useful both in carrying the container and in effecting removal of the cover.

The structure shown in Fig. II is generally similar to the form just described and similar reference numerals designate the parts which are identical. The difference between the two resides in the specific construction of the cover member 10 and the holder 16 for the preservative agent. In the present instance, the main portion or section 11 of the cover member 10 is formed with an axial projection 30, the upper end of which is closed by a diaphragm 31 soldered or otherwise secured thereby setting apart the interior of the projection 30 from the hollow portion of the cover proper and affording a recess for the nut 19 for engaging the screw 17 on the holder 16. The holder 16 in this case is proportioned so as to fit over the projection 30 and has an outwardly extended flange 32 for engagement against the sealing gasket 22.

Referring now to the last modification shown in Fig. III, the holder 16 for the preservative agent is here made as an integral part of the portion 14 of the cover member 10 and is set apart as a subdivision by a diaphram 33. The cup is made accessible by way of an axial tubular extension 34 of the diaphragm 33 which extends through a central opening in the recessed portion 35 of the top piece 36 of the cover. A stopper 37 of any suitable material may be employed as a closure for the tube 34. The upright peripheral flange portion 38 of the top piece 36 of the cover member may be corrugated or serrated for firm gripping in facilitation of the removal of the cover.

In containers of large capacity say a gallon or more, in order to avoid undue strain at the juncture between the two component parts of the receptacle member 1 and to secure greater stability and rigidity of the latter, we may employ a bracing member, such as indicated in dotted lines at 40 in Fig. I of the drawings. This member may be made of any appropriate material low in thermal conductivity and may take any form suitable to the purpose. In the example shown, it comprises an annular flanged portion 41 capable of receiving the lower end of the inner casing member 3 and a number of extremities reaching outwardly and downwardly to engage the bottom of the outer shell 2.

Having thus described our invention, we claim:

1. In a preservatory container, for food stuffs and beverages, the combination of a cylindrical receptacle constructed of sheet metal with an evacuated jacket enveloping a chamber for the substance to be preserved, said receptacle having a rolled screw-threaded prolongation of a diameter even with that of the outside of said receptacle beyond the open end of the latter, a hollow cover therefor formed at its top with a horizontal inwardly turned annular flange, a covering disk therefor, a cylindrical preservative holder having a horizontally directed flange for co-operation with the bottom of the cover, and means for removably connecting said holder concentrically to the base of the cover.

2. In a preservatory container for food stuffs and beverages of the character described, a hollow cover formed at its top with a horizontal inwardly turned annular flange, a covering disk therefor, a cylindrical preservative holder having a horizontally directed flange for cooperation with the bottom of the cover, and means for removably connecting said holder concentrically to the base of the cover.

3. In a preservatory container for food stuffs and beverages of the type described, a hollow cover formed at its top with a horizontal inwardly turned annular flange, a covering disk therefor, a cylindrical preservative holder having a horizontally directed flange for cooperation with the bottom of the cover, means insuring a fluid tight seal between said cover and holder, and means for removably connecting said holder concentrically to the base of the cover.

4. In a preservatory container for food stuffs and beverages of the class described, a hollow cover formed at its top with a horizontal inwardly turned annular flange, a circular covering disk therefor having a marginal overlap secured to the peripheral edge of said annular flange, a cylindric preservative holder having a horizontally directed flange for cooperation with the bottom of the cover, means insuring a fluid tight joint between the cover and holder, and means for removably connecting said holder concentrically to the base of the cover.

5. In a preservatory container for food stuffs and beverages of the class described, a hollow cover formed at its top with a horizontal inwardly turned annular flange, a circular covering disk therefor having a marginal overlap secured to the peripheral edge of said annular flange, a cylindric preservative holder having a horizontally directed flange for cooperation with the bottom of the cover, means insuring a fluid tight joint between the cover and holder, and means for removably connecting the holder to the bottom of the cover, said means comprising a shouldered nut bedded in the base of the cover and a headed screw cooperative therewith axially passed inwardly through the preservative holder.

In testimony whereof, we have hereunto signed our names at Charlottesville, Va., this fourth day of October 1922.

WILSON LAWRENCE SMITH.
GEORGE TAYLOE GWATHMEY, Jr.

Witnesses:
N. T. SHUMATE,
GEO. E. STEPHENS.